No. 787,483. PATENTED APR. 18, 1905.
D. A. TOMPKINS, T. S. DIFFEY & T. S. SIMPSON.
OIL PRESS.
APPLICATION FILED NOV. 9, 1904.

3 SHEETS—SHEET 1.

Witnesses:
D. W. Edelin
Chas. J. O'Neill

Inventors
D. A. TOMPKINS, T. S. DIFFEY.
T. S. SIMPSON.
By their attys.

No. 787,483. PATENTED APR. 18, 1905.
D. A. TOMPKINS, T. S. DIFFEY & T. S. SIMPSON.
OIL PRESS.
APPLICATION FILED NOV. 9, 1904.

3 SHEETS—SHEET 2.

Witnesses:
D. W. Edelin.
Chas. J. O'Neill.

Inventors.
D. A. TOMPKINS.
T. S. DIFFEY.
T. S. SIMPSON.
By their attys,
Pennie & Goldsborough No. 787,483. PATENTED APR. 18, 1905.
D. A. TOMPKINS, T. S. DIFFEY & T. S. SIMPSON.
OIL PRESS.
APPLICATION FILED NOV. 9, 1904.

3 SHEETS—SHEET 3.

Witnesses:

Inventors.
D. A. TOMPKINS,
T. S. DIFFEY,
T. S. SIMPSON.
By their attys.

No. 787,483.

Patented April 18, 1905.

UNITED STATES PATENT OFFICE.

DANIEL A. TOMPKINS, THOMAS S. DIFFEY, AND TALIAFERRO S. SIMPSON, OF CHARLOTTE, NORTH CAROLINA.

OIL-PRESS.

SPECIFICATION forming part of Letters Patent No. 787,483, dated April 18, 1905.

Application filed November 9, 1904. Serial No. 232,006.

*To all whom it may concern:*

Be it known that we, DANIEL A. TOMPKINS, THOMAS S. DIFFEY, and TALIAFERRO S. SIMPSON, citizens of the United States, residing in Charlotte, county of Mecklenburg, and State of North Carolina, have invented certain new and useful Improvements in Oil-Presses; and we do hereby declare the following to be a full, clear, and exact description of the invention, such as will enable others skilled in the art to which it appertains to make and use the same.

This invention relates to presses for extracting liquid from animal and vegetable matter— such, for example, as oil from seeds, nuts, and the like—and has for its object to provide a simple and efficient apparatus by means of which solid and liquid constituents may be almost entirely separated, the solid material being effectively broken up or comminuted in the pressing operation and finally ejected from the press in the form of a compacted meal cake, while the liquid constituent is forced out of the comminuted mass and through perforated screens and by way of suitable collecting channels or basins to a reservoir.

Figure 1:
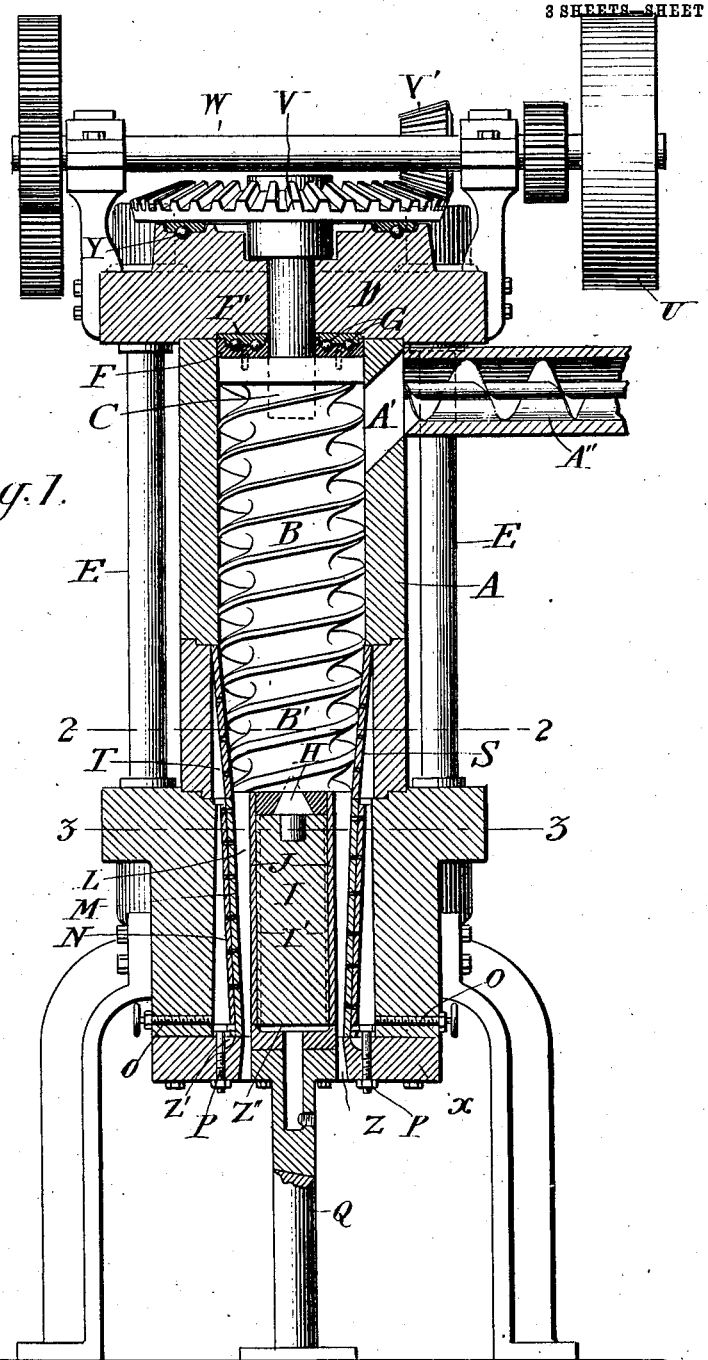
Figure 2:
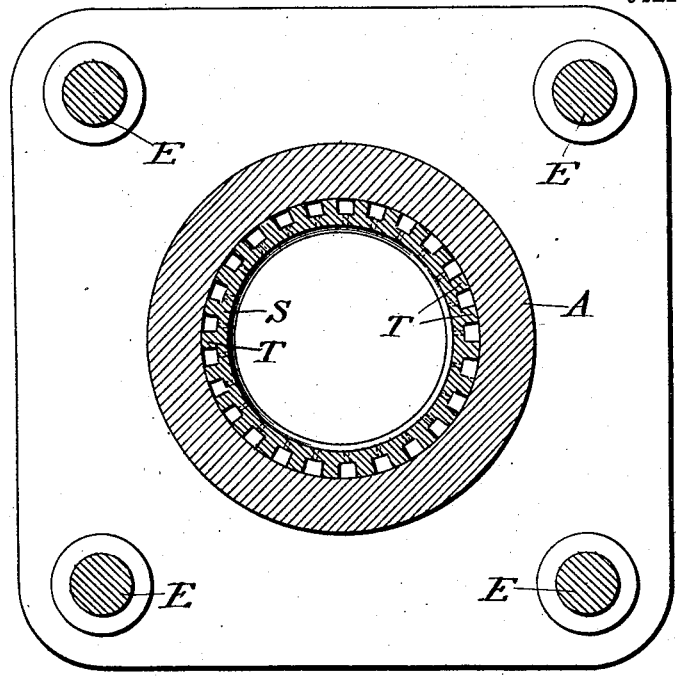
Figure 3:
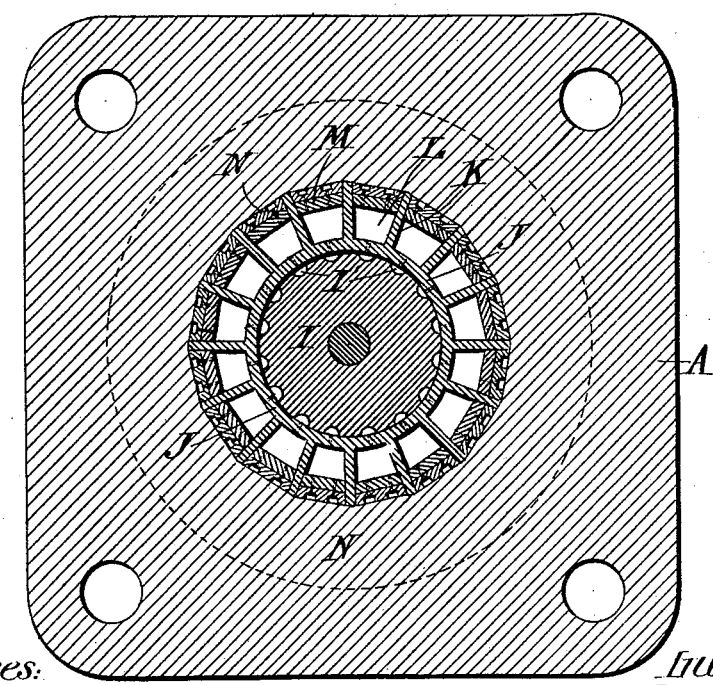
Figure 5:
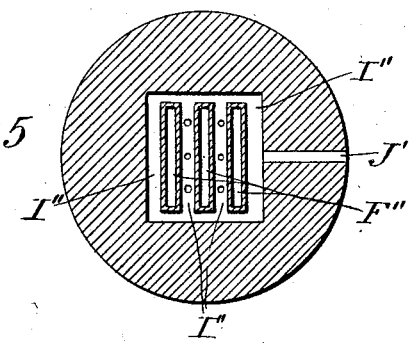
Figure 7:
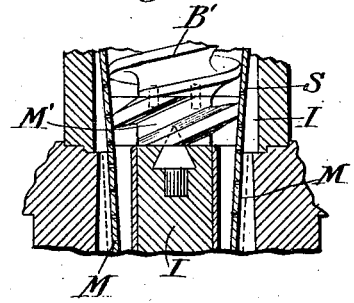
Figure 4:
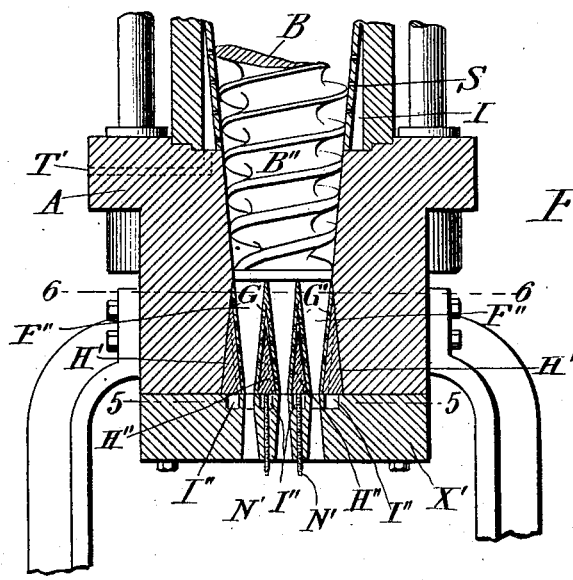
Figure 6:
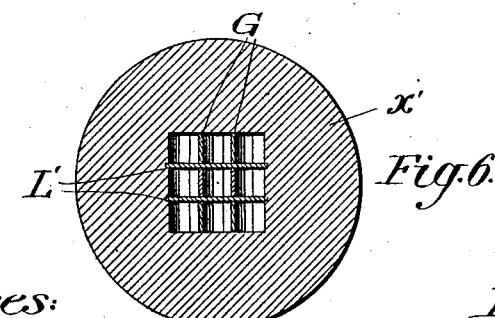

In the accompanying drawings, Figure 1 is a vertical sectional elevation of a screw-press involving our invention. Fig. 2 is a horizontal section on line 2 2 of Fig. 1. Fig. 3 is a corresponding section on line 3 3 of Fig. 1. Fig. 4 is a fragmentary sectional elevation showing a modified form of the invention. Figs. 5 and 6 are horizontal sections on line 5 5 and 6 6, respectively, of Fig. 4. Fig. 7 is a fragmentary sectional elevation of another modification involving the use of an additional forcing or propelling screw.

Referring to the drawings, A indicates the inclosing casing of the press, which is preferably formed of three separate portions arranged one above the other and having a generally cylindrical bore. The top of the casing A is closed by a cap D, the cap and the several sections being bound securely together by stout tie-rods E, which pass through the said cap and a flange on the lowest section of the casing A, as clearly indicated in Fig. 1. The lower end of the casing is provided with a plate X, having a central opening, said plate being attached to the lower edge of the casing by suitable bolts.

Within the central bore of the casing A is mounted a vertical screw B, which at its upper portion is generally cylindrical and fits snugly within the cylindrical bore of the casing. The lower portion B' of said screw is formed with a taper by reducing the depths of the threads of the screw, which threads are of uniform pitch throughout. This screw may have one or more threads, as may be required for the particular substances to be treated. The screw B is held in place by a vertical shaft C, passing through the cap D, and is provided with a squared end fitting in a corresponding socket on the top of the shaft, so that as said shaft is driven the screw is rotated. The bottom of the screw B is supported upon a cone-bearing H, fitting in a corresponding socket in the screw B, said cone-bearing being in turn supported on the stationary cylinder or core I, centrally disposed in the bore of the casing and in turn supported by a column Q. The tendency of the screw B is to press or lift upward, which causes the top of said screw to bear against the under face of the cap D, and in order to prevent undue wear between these parts and also to reduce the friction between them there is provided a stationary washer F on the under side of said cap, a second washer F' on the upper end of the screw B, and a series of antifriction-balls G, mounted in suitable raceways between said washers.

On the upper end of the shaft C there is secured a bevel-gear V, to which rotatory motion is imparted from a pulley U, mounted upon a counter-shaft W, connected to said gear V by suitable reducing-gearing.

Mounted in the middle section of the casing A is a tapering screen-section S, which snugly engages the tapered section B' of the screw B. Said section S is provided with suitable perforations, which communicate with channels T, formed between wedge-shaped ribs on the outside of the screen, said channels serving to receive and conduct the liquid expressed from the matter in the press and the ribs serving to accurately center the screen-section.

The stationary cylinder or core I is provided with a series of longitudinal channels I' upon its outer surface, and said core is surrounded by an annular screen-section J, which is provided with perforations communicating with the channels I'. The channels I' connect with a basin Z", which has an outlet through the column Q. The annular screen J has projecting from its outer face a series of longitudinal ribs or wings K, by means of which the screen J and the cylinder I are accurately centered, and the annular space formed between the screen J and the inner walls of the casing A is divided into multiple outlet ports or openings L.

Mounted in the outlet-openings L and forming continuations of the tapered screen-section S are a series of perforated screen-sections M, which are held in position between the ribs K by wedges N, which are provided with grooves on their rear faces, which connect with the perforations in the screen-sections M and also with the channels or grooves T in the rear of the tapered screen-section S, so that the liquid matter which is expressed finds its way through the openings in the screens and into the grooves or channels to the rear of the same, and thence into a suitable basin Z' in the lower cover X, whence it is conducted by suitable pipes communicating with the basin aforesaid. The wedges N are adjustable longitudinally by means of suitable bolts P, passing through the bottom plate X, so that the screen-plates M may be adjusted bodily toward and from the central cylinder or core I to provide a more or less constricted outlet for the solid material after the same leaves the screw. In order to regulate the lower part of the annular outlet Z, by means of which the solid material is discharged, the several wedges N are provided with set-screws O, mounted in the lower portion of the casing A, which set-screws serve to adjust the lower portion of the wedges toward and from the central column, thereby restricting or enlarging the annular outlet, as the case may be.

The operation of the apparatus as above described is substantially as follows: Power is applied by means of pulley U and transmitted by means of the reducing-gearing to the gear V, which imparts the desired rotatory motion to the screw B. The material to be pressed is fed into the inlet A' at the upper end of the casing A by means of a screw conveyer A", which constitutes a force-feed. The material passes in between the grooves of the screw B and is fed downward by the rotatory motion of the latter, and when said material reaches the tapered portion B' of the screw the pressing action proper begins as the material is forced to occupy the restricted space between the tapered screen-section S and the bottoms of the grooves between the threads on the tapered screw-section B'. In passing through the upper portion of the press the material is effectively ground and comminuted as it is carried around by the screw B, and when the material so comminuted reaches the tapered portion of the screw the liquid constituents therein are expressed in part and flow through the perforations in the screen S into the channels T in the rear of said screen and thence by way of the channels in the rear of wedges N to the collecting-basin Z'. The pressure applied to the material is gradually increased as said material is forced downward by the tapered portion of the screw B until the material is forced into the channels L between the ribs K, projecting from the screen J. Here the rotatory motion of the material ceases; but the vertical pressure thereon gradually increases as the material moves downward through the constricted passages L until practically all of the liquid constituents of the material are forced out of the same and through the screen J or the screen-sections M, whence they find their way into the basins Z" or Z', respectively. The solid material now practically freed from liquid constituents is forced out of the annular outlet Z, formed between the sides of the central orifice in the plate X and the foot of the annular screen J. Should it be found necessary to apply greater pressure to the material as it passes through the channels L, the wedges N are adjusted upward, so as to uniformly decrease the spaces between the annular screen J and the screen-sections M. Should it be found necessary to reduce the pressure on the material, the wedges are eased off and the cross-section of the passages L thereby uniformly increased from end to end. When it is desired to restrict the discharge-opening Z so as to extract the last possible quantity of liquid from the material to be pressed, the lower ends of the wedges N are moved outward toward the screen J by means of the set-screws O, thereby constricting the outlet Z to any desired degree.

In Fig. 4 there is shown a modified form of press in which the stationary cylinder or core I is omitted, the tapered end of the screw B being prolonged to occupy a correspondingly-tapered section of the casing A. Below the elongated tapered section B" of the screw B are mounted a series of transverse screens G', which are supported and adjusted by suitable wedges H' and H", said wedges serving to adjust the screen-sections G' laterally toward and from each other to respectively constrict and expand the outlet-channels F". The wedges are adjusted by suitable screws N', which pass through the bottom plate X'. The liquid which passes through the screens is led by the channels in the wedges into the collecting troughs or grooves I″ in the plate X′, whence it is conducted by a suitable outlet J′. A greater number of outlets F″ may be provided, thereby dividing the cake into a larger number of small sections, by means of division plates or partitions L′, which are mounted in the discharge-opening at right angles to the screen G′, as shown in Fig. 6. The oil which is collected by the screen S and the channels T in the rear of the same is led from the press by a suitable tap T′, as shown in Fig. 4.

When it is necessary to apply greater force to the material as it is delivered from the screw-section B′ into the outlet-passages of the press, there is provided a forcer or propeller M′, which is secured to the lower end of the screw B, as shown in Fig. 7. This forcer or propeller comprises a screw-section having a pitch sufficient to take the material which is delivered by the tapered section B′ of the screw B and expel the same through the outlet-passages. It is to be understood, of course, that this forcer or propeller may be employed with either of the types of press heretofore described, the only change required to adapt the same to the press being the proper shortening of the lower end of the screw B.

The press as above described is particularly adapted for extracting oil from seeds and nuts, which it accomplishes with great thoroughness, leaving the solid constituents as a substantially dry comminuted meal, which is delivered from the press in relatively small cakes.

Having thus described our invention, what we claim, and desire to secure by Letters Patent, is—

1. In a press, the combination of a rotary tapering screw, a casing surrounding the same having tapering perforated walls adjacent to said screw and an outlet in alinement with said screw, and adjustable screen-sections in said outlet to vary the size of the latter.

2. In a press, the combination of a rotary tapering screw, a casing surrounding the same having tapering perforated walls adjacent to said screw and an outlet in alinement with said screw, and laterally-adjustable screen-sections in said outlet to vary the size of the latter.

3. In a press, the combination of a rotary tapering screw, a casing surrounding said screw and having an outlet in axial alinement therewith, a tapering screen-section removably mounted in said casing and surrounding said tapering screw, and adjustable screen-sections in said outlet to vary the size of the latter.

4. In a press, the combination of a rotary tapering screw, a casing surrounding said screw and having an outlet in axial alinement therewith, a tapering screen-section removably mounted in said casing and surrounding said tapering screw, screen-sections in said outlet, and means to adjust said screen-sections laterally in the outlet to vary the size of the latter.

5. In a press, the combination of a rotary tapering screw, a tapering perforated screen surrounding said screw, an annular screen below and in axial alinement with said screw, screen-sections surrounding the annular screen, and means for adjusting said screen-sections toward and from the annular screen to regulate the discharge-outlet from the press.

6. In a press, the combination of a casing having a generally cylindrical bore, a rotary screw therein having a tapering end section, a tapering perforated screen surrounding the tapering screw-section, an annular screen below and in axial alinement with said screw, screen-sections surrounding the annular screen, and means for adjusting said screen-sections longitudinally and laterally with respect to said annular screen to regulate the discharge from the press.

7. In a press, the combination of a casing having a generally cylindrical bore, a rotary screw therein having a tapering end section, a tapering perforated screen surrounding the tapering screw-section, an annular screen below and in axial alinement with said screw, screen-sections surrounding the annular screen, and adjustable wedges for moving said screen-sections toward and from the annular screen to regulate the discharge from the press.

8. In a press, the combination of a casing having a generally cylindrical bore, a rotary screw therein having a tapering end section, a tapering perforated screen surrounding the tapering screw-section, an annular screen below and in axial alinement with said screw, screen-sections surrounding the annular screen, adjustable wedges for moving said screen-sections toward and from the annular screen, and set-screws for moving the ends of said screen-sections adjacent to the press-outlet toward and from the annular screen to regulate the discharge from the press.

In testimony whereof we affix our signatures in presence of two witnesses.

DANIEL A. TOMPKINS.
THOMAS S. DIFFEY.
TALIAFERRO S. SIMPSON.

Witnesses:
JNO. C. WATSON,
FRED L. McGUIM.